United States Patent
Levi et al.

(10) Patent No.: US 11,764,939 B1
(45) Date of Patent: Sep. 19, 2023

(54) CONTROLLING LATENCY OF CABLE INTERCONNECTIONS

(71) Applicant: Mellanox Technologies, Ltd., Yokneam (IL)

(72) Inventors: Lion Levi, Yavne (IL); Guy Lederman, Nes Ziona (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/864,454

(22) Filed: Jul. 14, 2022

(51) Int. Cl.
  *H04L 7/00* (2006.01)
  *H04L 43/50* (2022.01)
  *H04L 43/0864* (2022.01)
  *H04L 43/0888* (2022.01)
  *H04L 43/0852* (2022.01)
  *H04L 43/16* (2022.01)

(52) U.S. Cl.
  CPC ........ *H04L 7/0041* (2013.01); *H04L 43/0852* (2013.01); *H04L 43/0864* (2013.01); *H04L 43/0888* (2013.01); *H04L 43/50* (2013.01); *H04L 43/16* (2013.01)

(58) Field of Classification Search
  CPC .............. H04L 43/0852; H04L 43/0864; H04L 43/0882; H04L 43/16; H04L 43/50; H04L 43/062; H04L 43/0888; H04L 43/55; H04L 43/0894; H04L 43/08; H04L 43/0876; H04L 45/24; H04L 1/1893; H04L 49/90; H04L 1/0002; H04L 1/1874; H04L 47/805; H04L 41/0896; H04L 45/123; H04L 41/145; H04L 7/0041
  See application file for complete search history.

(56) References Cited

U.S. PATENT DOCUMENTS

| | | | |
|---|---|---|---|
| 6,377,640 B2 * | 4/2002 | Trans ..................... | H04L 1/0047 375/354 |
| 8,891,392 B2 * | 11/2014 | Cook ................... | H04L 43/0852 370/252 |
| 9,876,565 B2 | 1/2018 | Levy | |
| 10,079,782 B2 | 9/2018 | Haramaty et al. | |
| 11,271,874 B2 | 3/2022 | Levi et al. | |
| 11,336,383 B2 | 5/2022 | Mula et al. | |
| 2003/0053175 A1 | 3/2003 | Szczepanek et al. | |
| 2003/0088799 A1 | 5/2003 | Bodas | |
| 2006/0146722 A1 * | 7/2006 | Dube ..................... | H04L 41/145 370/241 |

(Continued)

*Primary Examiner* — Glenton B Burgess
*Assistant Examiner* — Rachel J Hackenberg
(74) *Attorney, Agent, or Firm* — KLIGLER & ASSOCIATES PATENT ATTORNEYS LTD

(57) ABSTRACT

A method for communication in a network that includes multiple nodes having respective network interfaces and interconnects between the network interfaces, which include at least first and second network interfaces connected by a physical interconnect having a given latency. The method includes defining a target latency, greater than the given latency, for communication between the first and second network interfaces. Data are transmitted between the first and second network interfaces over the physical interconnect while applying, by at least one of the first and second network interfaces, a delay in transmission of the data corresponding to a difference between the target latency and the given latency.

18 Claims, 3 Drawing Sheets

(56) References Cited

U.S. PATENT DOCUMENTS

| | | | |
|---|---|---|---|
| 2006/0239271 A1* | 10/2006 | Khasnabish | H04L 45/22 370/395.21 |
| 2008/0119140 A1 | 5/2008 | Maligeorgos et al. | |
| 2010/0128344 A1 | 5/2010 | Lichtman | |
| 2010/0166421 A1 | 7/2010 | Hashiguchi et al. | |
| 2011/0013905 A1 | 1/2011 | Wang et al. | |
| 2012/0191997 A1 | 7/2012 | Miller | |
| 2013/0148956 A1* | 6/2013 | Khotimsky | H04Q 11/0067 398/2 |
| 2013/0236188 A1 | 9/2013 | Hung et al. | |
| 2013/0318385 A1 | 11/2013 | Miller | |
| 2014/0186023 A1 | 7/2014 | Louderback | |
| 2015/0016819 A1 | 1/2015 | Piciaccia et al. | |
| 2015/0270899 A1* | 9/2015 | Levy | H04B 10/0773 398/58 |
| 2017/0153953 A1* | 6/2017 | Puranik | G06F 11/2017 |
| 2018/0013541 A1* | 1/2018 | Huang | H04L 43/0864 |
| 2018/0191601 A1* | 7/2018 | Micallef | H04L 43/0858 |
| 2021/0006386 A1* | 1/2021 | Qi | H04J 3/0676 |

\* cited by examiner

CONTROLLING LATENCY OF CABLE INTERCONNECTIONS

FIELD OF THE INVENTION

The present invention relates generally to packet communication networks, and particularly to methods and systems for testing network configuration.

BACKGROUND

Networks in large data centers use thousands of cables of different types and lengths, commonly operating at data speeds in the tens or hundreds of gigabits/sec. Typically, passive copper cables are used over short lengths, up to a few meters; active copper cables are used over intermediate lengths; and optical cables are used over longer lengths, up to 50 meters or more in some cases. Optical cables may be "active," with transceivers built into the cable connectors, or "passive," with optical connectors at the cable ends. Each type and length of cable is characterized by a different latency, defined as the time that elapses between output of a block of data to the cable from a transmitting node to receipt of the block of data at the receiving node.

U.S. Pat. No. 11,271,874, whose disclosure is incorporated herein by reference, describes a network adapter with a time-aware packet-processing pipeline. The network adapter includes a host interface configured to communicate with a host, a network interface configured to communicate with a communication network, and packet processing circuitry. The packet processing circuitry is configured to receive a packet from the host via the host interface, or from the communication network via the network interface, to receive an indication of a network time used for synchronizing network elements in the communication network, to match the packet to a rule, the rule including a condition and an action, and to perform the action in response to the packet meeting the condition, wherein one or more of (i) the condition in the rule and (ii) the action in the rule, depend on the network time.

U.S. Pat. No. 11,336,383, whose disclosure is incorporated herein by reference, describes a packet scheduling system with a desired physical transmission time for packets. A switching device is provided, including an input interface configured to communicate with a packet source, an output interface configured to communicate with a packet destination, and packet processing circuitry. The packet processing circuitry is configured to receive a plurality of packets from the packet source via the input interface, each of the plurality of packets being associated with a packet descriptor, at least one of the packet descriptors being a transmission time packet descriptor including a desired physical transmission time for the packet associated with the transmission time packet descriptor, to receive an indication of a clock time, and for each packet associated with a transmission time packet descriptor, to physically transmit the packet associated with the transmission time packet descriptor, via the output interface, at a clock time corresponding to the desired physical transmission time.

SUMMARY

Embodiments of the present invention that are described hereinbelow provide methods for controlling latency of data transmission in a network, as well as systems and software implementing such methods.

There is therefore provided, in accordance with an embodiment of the invention, a method for communication in a network that includes multiple nodes having respective network interfaces and interconnects between the network interfaces, which include at least first and second network interfaces connected by a physical interconnect having a given latency. The method includes defining a target latency, greater than the given latency, for communication between the first and second network interfaces. Data are transmitted between the first and second network interfaces over the physical interconnect while applying, by at least one of the first and second network interfaces, a delay in transmission of the data corresponding to a difference between the target latency and the given latency.

In some embodiments, applying the delay includes applying delays by both the first and the second network interfaces in bidirectional transmission over the physical interconnect. Additionally or alternatively, applying the delay includes receiving, in the at least one of the first and second network interfaces, data blocks for transmission over the physical interconnect, and buffering the data blocks before transmission for a period corresponding to the delay that is to be applied.

In some embodiments, defining the target latency includes defining multiple types of physical interconnects having different, respective latencies, including at least a first type having a first latency and a second type having a second latency, greater than the first latency, and transmitting the data includes testing a configuration of the network in which a first interconnect of the first type between the first and second network interfaces is to be replaced by a second interconnect of the second type, by transmitting data between the first and second network interfaces over the first interconnect while applying, by the at least one of the first and second network interfaces, a delay in transmission of the data corresponding to a difference between the second latency and the first latency. Typically, the multiple interconnect types include a set of cable types including copper cables and optical cables.

In one such embodiment, testing the configuration includes adjusting the delay over two or more different delay values in order to test configurations in which the first interconnect is to be replaced by different interconnects of two or more different types. Additionally or alternatively, testing the configuration includes testing configurations in which the physical interconnects between multiple different pairs of the network interfaces are to be replaced by other physical interconnects of one or more other types by concurrently applying delays by the network interfaces in the multiple different pairs.

In the disclosed embodiments, the configuration is tested without physically replacing the first interconnect with the second interconnect. In one embodiment, testing the configuration includes applying the delay in a test network, and the method includes, after testing the configuration, implementing the tested configuration by physically installing the second interconnect in an operational network.

In other embodiments, applying the delay includes balancing data transmission delays among physical interconnects of multiple different types, having different, respective latencies, which are used concurrently for data transmission in the network. In a disclosed embodiment, balancing the data transmission delays includes balancing the different, respective latencies of cables of different, respective lengths.

There is also provided, in accordance with an embodiment of the invention, a communication system, which includes a network including multiple nodes having respective network interfaces and interconnects between the network interfaces, which include at least first and second network interfaces connected by a physical interconnect having a given latency. A processor is configured to receive a definition of a target latency, greater than the given latency, for communication between the first and second network interfaces, and to instruct at least one of the first and second network interfaces to transmit data over the physical interconnect while applying a delay in transmission of the data corresponding to a difference between the target latency and the given latency.

The present invention will be more fully understood from the following detailed description of the embodiments thereof, taken together with the drawings in which:

DETAILED DESCRIPTION OF EMBODIMENTS

Figure 1A:
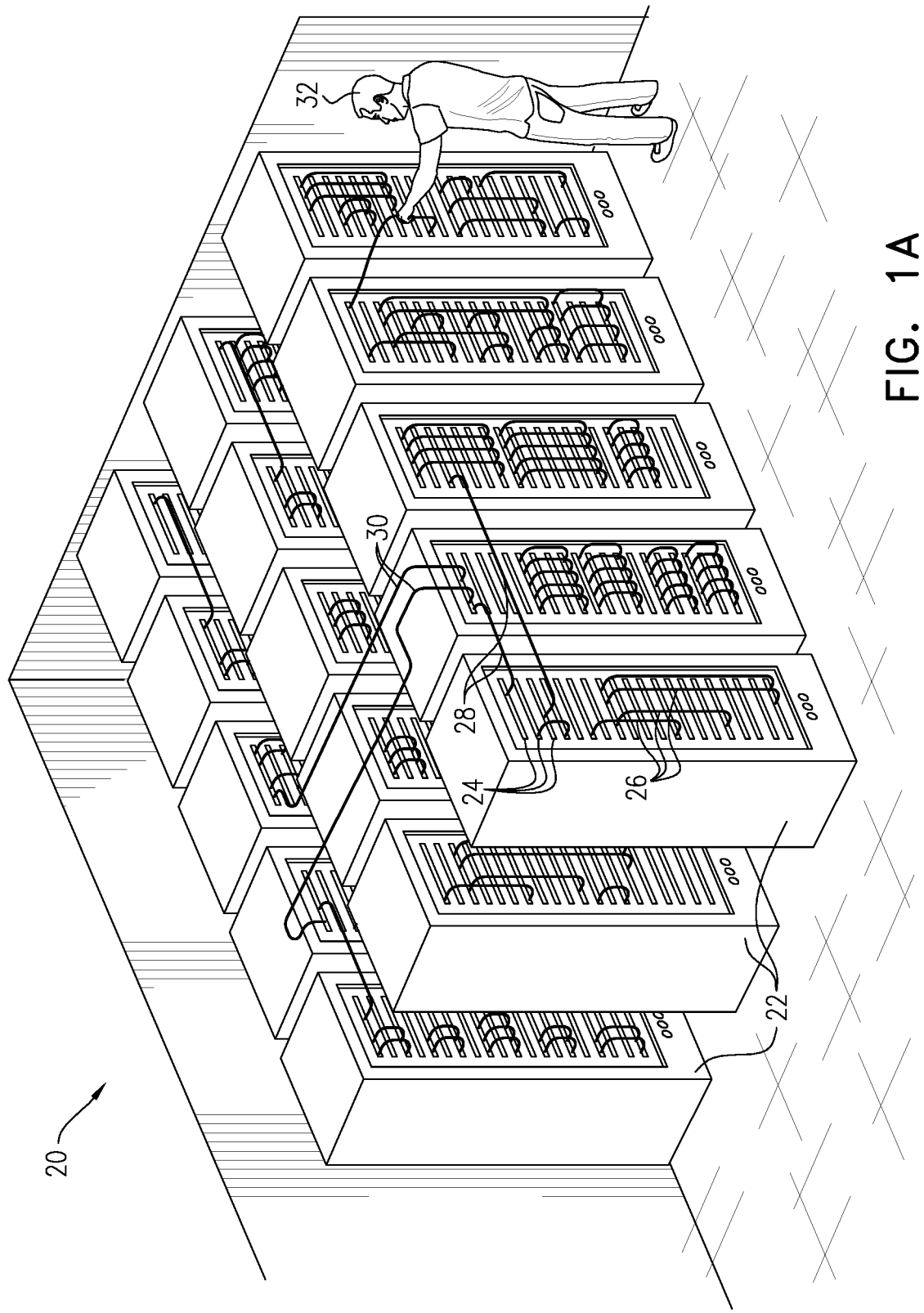
FIG. 1A is a schematic, pictorial illustration of a data center with controlled communication latency, in accordance with an embodiment of the invention.

In a typical packet data network, the nodes have respective network interfaces, which are connected to one another by physical interconnects. The term "physical interconnect" is used in the present description and in the claims to refer to the entire assembly that is used to connect a pair of nodes, including the end connectors and the cabling, which may be metal (typically copper) or optical, as well as active components, such as transceivers and repeaters, that are integrated into some types of physical interconnects. Although the description below relates primarily to cable interconnects, which may be plugged in and out, physical interconnects may also include non-pluggable components, such as transceivers and circuit traces, which are permanently fixed to the corresponding nodes. Each type of physical interconnect has a certain characteristic latency, which is determined by length and type of the metal or optical cabling, as well as by the active components (if any).

The differences in the latencies of different types of physical interconnects can cause bottlenecks in network throughput. For example, in large-scale network-based computing applications, high-speed computational operations and data exchange must be coordinated among multiple computing nodes operating concurrently. When the cable latencies among the nodes are unbalanced, nodes may be required to buffer large amounts of data, operations may be delayed, and the speed and efficiency of the entire application may be compromised. Latency differences in a network can also give rise to congestion and to unbalanced arbitration and forwarding decisions, leading to sub-optimal use of network resources and side-effects such as packets arriving out of order at their destinations.

Engineers developing systems for deployment in data centers attempt to understand and resolve these problems by choosing and testing different cable configurations. The configuration that is used in the test network in the development facility should be chosen to achieve optimal communication performance while satisfying the physical constraints of the data center. Finding the best cable configuration is typically carried out by a process of trial and error, in which existing cables are physically replaced with cables of other types and lengths, followed by evaluation of the effect on network performance. This approach is laborious and time-consuming, requiring engineers to maintain large stocks of cables and plug different cables in and out many times until a solution is found.

Embodiments of the present invention that are described herein enable engineers to adjust and optimize the latencies of interconnects between the nodes of a network without changing cables. In the disclosed embodiments, the network interfaces of a given pair of nodes are connected by a physical interconnect having a given latency. A target latency, which is greater than the given latency, is defined for the communication link between these nodes. This target latency may be chosen manually or automatically, for example, in order to balance the latency of this communication link with the latencies of other links in the network. To achieve the target latency in transmitting data between the network interfaces over the physical interconnect, one or both of the network interfaces apply a delay in transmission of the data. The delay that is applied corresponds to the difference between the target latency and the given latency.

In one embodiment, the delay is implemented by buffering data blocks in the network interfaces before transmission for a period corresponding to the delay that is to be applied, and then transmitting the data blocks from the buffer following the appropriate delay. This implementation takes advantage of buffers that are typically already present in the network interfaces, for purposes of network flow control, for example. To control the packet transmission times, the network interfaces may use time-aware packet transmission pipelines, which control the time at which each packet is transmitted to the physical interconnect, for example as described in the above-mentioned U.S. Pat. No. 11,271,874 or 11,336,383. Alternatively, the network interfaces may simply delay transmission of each packet by a predefined number of clock ticks.

By varying the transmission delays, engineers are able to test the effects of changing the physical interconnects between pairs of nodes in a network, without having to physically replace the cables. In one embodiment, this capability is used in a test network, to simulate different configurations of physical interconnects in an actual operational network. Once the desired configuration has been found in simulation, engineers can install the corresponding physical interconnects in the operational network. When problems of latency occur in the operational network, the simulation environment can be used to evaluate possible solutions. In another embodiment, these techniques are used in an operational network for balancing data transmission delays among physical interconnects of different types, having different, respective latencies, typically including cables of different lengths, which are used concurrently for data transmission in the network.

FIG. 1A is a schematic, pictorial illustration of a data center 20 with controlled communication latency, in accordance with an embodiment of the invention. Data center 20 contains many racks 22, each holding multiple network nodes 24, such as switches and servers. Each node 24 comprises one or more network interfaces, which typically comprise link-layer and physical-layer (PHY) interface circuits, such as multi-gigabit Ethernet medium access control (MAC) and PHY circuits or InfiniBand link-layer and PHY circuits. These interface circuits typically comprise suitable digital hardware logic and analog components, as are known in the art.

Nodes 24 are interconnected by physical interconnects comprising cables 26, 28, 30 of different types, which are installed by an operator 32, such as a technician or engineer. For example, cables 26 may comprise passive copper cables, used to connect nearby nodes, within a range of 2-3 m; cables 28 may comprise active copper cables, used over distances in the range of 5 m or more; and cables 30 may comprise optical cables, either active or passive, used over distances as long as 30-50 m or more. Alternatively, the various cable types may be used over different ranges of lengths; and in particular, optical cables may be used over short ranges in some cases. As noted earlier, each type of cable has its own characteristic latency. In one embodiment, illustrated in FIG. 1B, the latencies are tested and chosen by simulation; and operator 32 then installs the appropriate physical cables in data center 20 to match the simulation results. Alternatively or additionally, the transmission delays applied by the network interfaces may be adjusted manually or automatically to balance the inherent latencies of cables of different types and lengths that are used in data center 20.

Figure 1B:
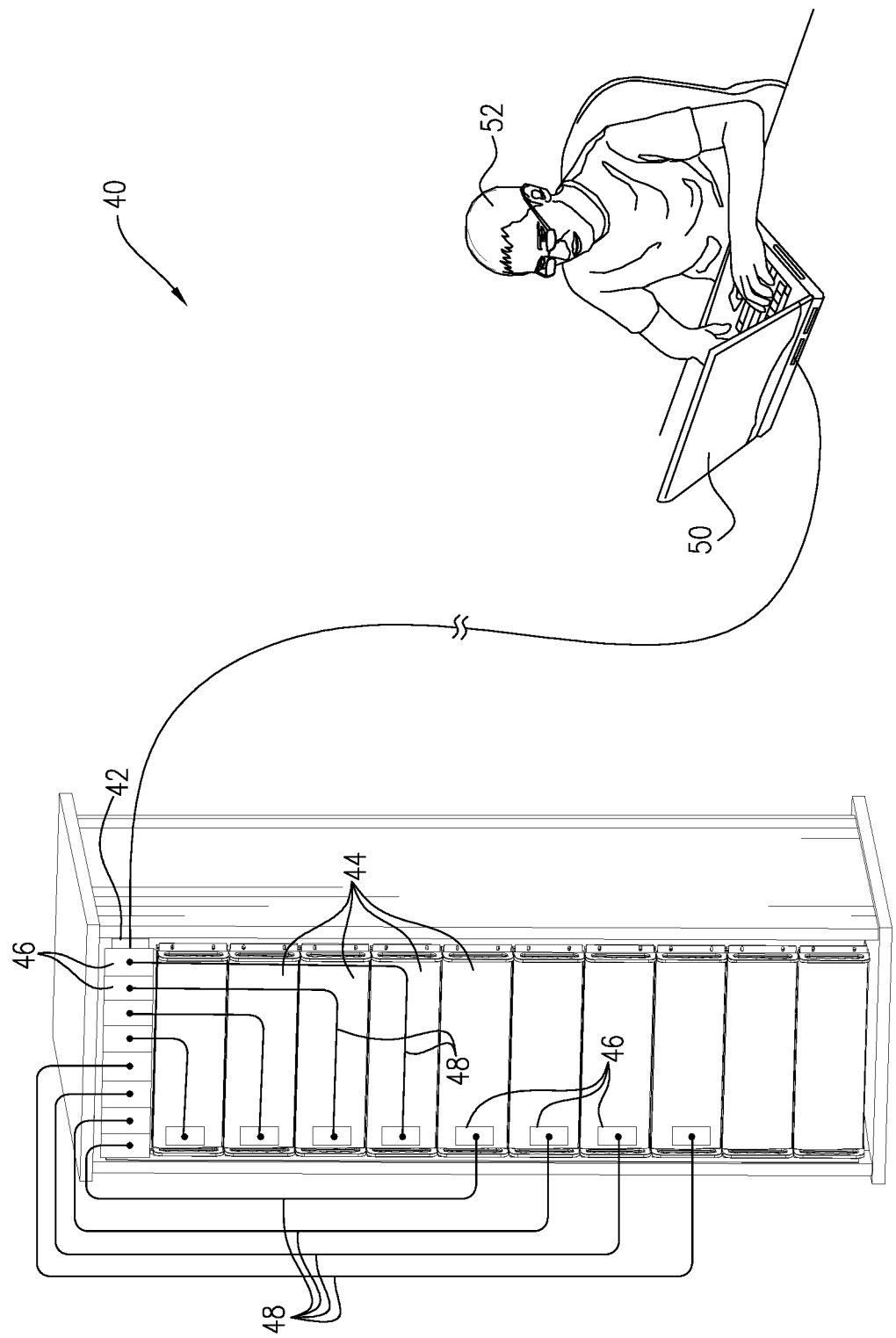
FIG. 1B is a schematic, pictorial illustration of a cabling test system, in accordance with an embodiment of the invention.

FIG. 1B is a schematic, pictorial illustration of a cabling test system 40, in accordance with an embodiment of the invention. Test system 40 in the pictured example comprises a switch 42, having multiple ports comprising network interfaces 46 and additional nodes 44, such as computing nodes with network interfaces 46, as well. Network interfaces 46 are interconnected by cables 48. A network engineer 52 uses a control processor 50 to set transmission delays applied by various ones of network interfaces 46 and to evaluate the effects of the transmission delays on network performance parameters, such as data throughput, load balancing, congestion, and packet ordering.

While network interfaces 46 are connected by cables 48 of a certain type, having a certain known latency, test system 40 can be used to test the effect of using other types of cables, for example longer cables, having a known, longer latency, without replacing the actual physical cables. For this purpose, control processor 50 instructs switch 42 and other nodes 44 to transmit data between certain network interfaces 46 over cables 48 while applying a delay in transmission of the data corresponding to the difference between the target latency (i.e., the known latency of the longer cables) and the actual latency of cables 48. Control processor 50 may instruct the switch and other nodes to adjust the delay over two or more different delay values in order to test configurations in which cables 48 are to be replaced by different interconnects of two or more different types. By applying different delays concurrently in different pairs of network interfaces 46, engineer 52 is able to test configurations in which cables 48 interconnecting multiple different pairs of network interfaces 46 are to be replaced by other physical interconnects of one or more other types.

In this manner, engineer 52 tests different possible configurations of an operational network, such as the network in data center 20 (FIG. 1A), without physically replacing the cables. After identifying and testing an optimal configuration in test system 40, the tested configuration can then be implemented by physically installing the appropriate cables in the operational network in data center 20.

Figure 2:
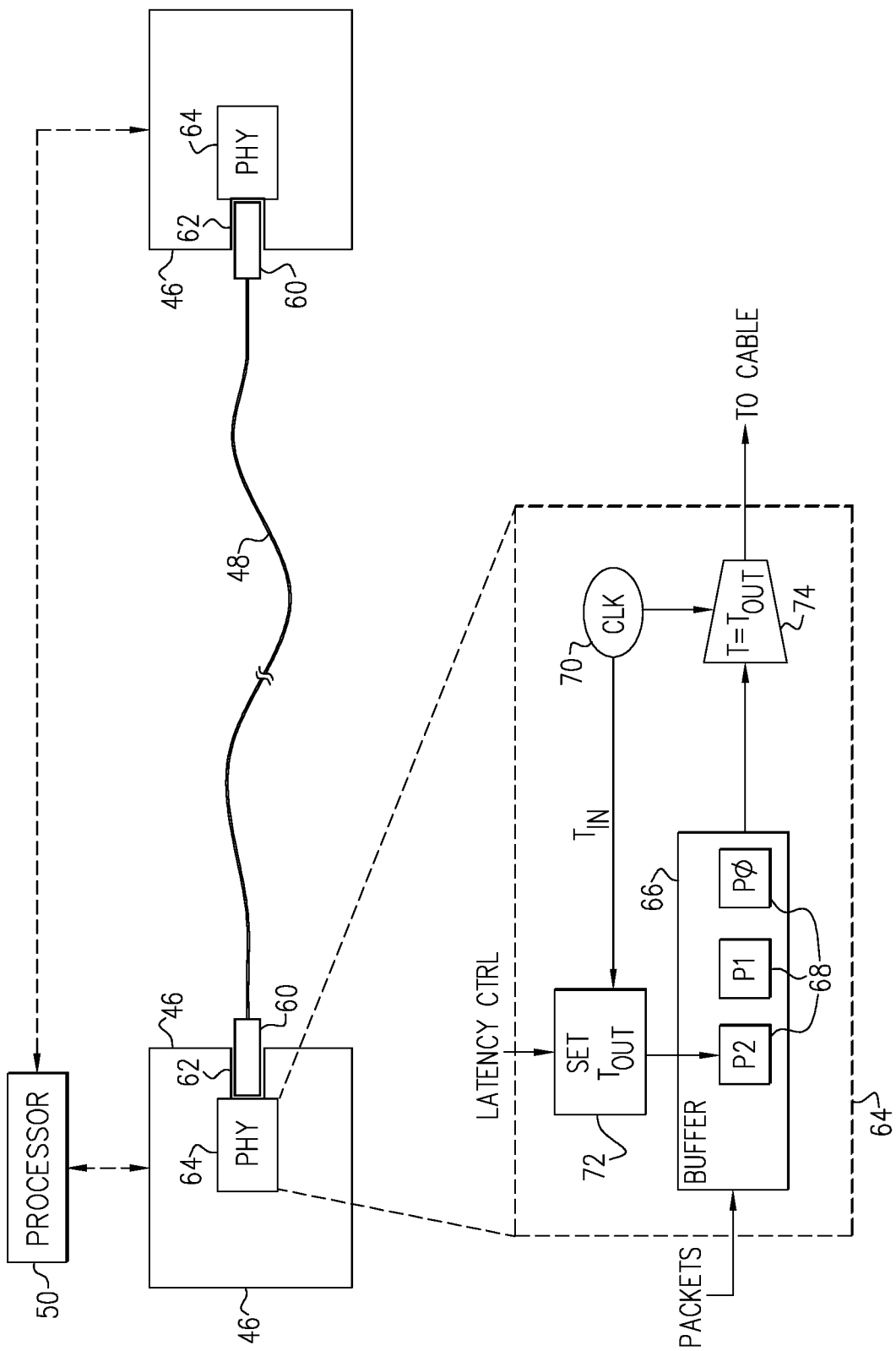
FIG. 2 is a block diagram that schematically illustrates a communication link with controlled latency, in accordance with an embodiment of the invention.

FIG. 2 is a block diagram that schematically illustrates a communication link with controlled latency between a pair of network interfaces 46, in accordance with an embodiment of the invention. Network interfaces 46 comprise respective PHY interfaces 64, which include cable receptacles 62. Cable 48 comprises connectors 60, which plug into receptacles 62. As noted earlier, connectors 60 may be passive, or they may include active components, such as optical transceivers. Control processor 50 sets and adjusts the transmission delays applied by network interfaces 46 to data transmitted over cable 48.

In the pictured embodiment, PHY interfaces 64 apply the delays using a time-aware processing pipeline, as shown in an inset in FIG. 2, which operates in accordance with the instructions provided by control processor 50. Alternatively, PHY interfaces 64 may comprise other sorts of delay circuits; for example, the PHY interface may simply delay each outgoing data block by a certain number of clock ticks corresponding to the desired latency. Further alternatively, the controlled delays may be applied by the link-layer interface (not shown) in network interfaces 46. All such alternative implementations are considered to be within the scope of the present invention. Such controlled-delay techniques can be applied not only in test system 20, but also in operational networks in order to balance data transmission delays among different links.

As shown in the inset, PHY interface 64 receives data blocks 68, such as blocks of packet data, that are to be transmitted over cable 48, and holds the data blocks in a buffer 66, such as a first-in-first-out (FIFO) buffer, while awaiting transmission. The data blocks are input to network interface 46 by the network node, such as a switch or compute node, to which the network interface belongs. A time-stamping circuit 72 detects the time of arrival $T_{IN}$ of each data block 68 in buffer 66, using a local clock 70, and adds a timestamp to each data block indicating the time $T_{OUT}$ at which the data block is to be transmitted. ($T_{IN}$ and $T_{OUT}$ are determined by local clock 70 and need not been synchronized with the network time.) Time-stamping circuit 72 sets the time difference $T_{OUT}-T_{IN}$ to be equal to the transmission delay that network interface 46 has been instructed to apply. An output control circuit 74 checks the timestamp of the data block 68 at the head of the queue in buffer 66 and releases the data block to cable 48 when the current time indicated by local clock 70 is equal to $T_{OUT}$. The size of buffer 66 determines the maximum transmission delay that network interface 46 is able to apply.

Typically, to emulate actual cable latencies in bidirectional communications, network interfaces 46 of the nodes at both ends of cable 48 apply the same transmission delays. Alternatively, a transmission delay may be applied in only one direction, or different delays may be applied in the different transmission directions.

Although the embodiments described above relate primarily to controlling latencies that are associated with various sorts of cables, the principles of the present invention may similarly be applied, mutatis mutandis, to non-pluggable interconnects and components, as defined above. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A method for communication, comprising:
in a network that includes multiple nodes having respective network interfaces and interconnects between the network interfaces, defining, for use in the network, multiple types of physical interconnects having different, respective latencies, including at least a first type having a first latency and a second type having a second latency, greater than the first latency;

connecting first and second network interfaces in the network by a first physical interconnect of the first type; and testing a configuration of the network in which the first physical interconnect is to be replaced by a second physical interconnect of the second type, without physically replacing the first physical interconnect with the second physical interconnect, by transmitting data between the first and second network interfaces over the first physical interconnect while applying, by at least one of the first and second network interfaces, a delay in transmission of the data corresponding to a difference between the second latency and the first latency.

2. The method according to claim 1, wherein applying the delay comprises applying delays by both the first and the second network interfaces in bidirectional transmission over the first physical interconnect.

3. The method according to claim 1, wherein applying the delay comprises receiving, in the at least one of the first and second network interfaces, data blocks for transmission over the first physical interconnect, and buffering the data blocks before transmission for a period corresponding to the delay that is to be applied.

4. The method according to claim 1, wherein testing the configuration comprises adjusting the delay over two or more different delay values in order to test configurations in which the first physical interconnect is to be replaced by different interconnects of two or more different types.

5. The method according to claim 1, wherein testing the configuration comprises testing configurations in which the physical interconnects between multiple different pairs of the network interfaces are to be replaced by other physical interconnects of one or more other types by concurrently applying delays by the network interfaces in the multiple different pairs.

6. The method according to claim 1, wherein testing the configuration comprises applying the delay in a test network, and wherein the method comprises, after testing the configuration, implementing the tested configuration by physically installing the second physical interconnect in an operational network.

7. The method according to claim 1, wherein the multiple interconnect types comprise a set of cable types including copper cables and optical cables.

8. The method according to claim 1, wherein applying the delay comprises balancing data transmission delays among physical interconnects of multiple different types, having different, respective latencies, which are used concurrently for data transmission in the network.

9. The method according to claim 8, wherein balancing the data transmission delays comprises balancing the different, respective latencies of cables of different, respective lengths.

10. A communication system, comprising:

multiple types of physical interconnects having different, respective latencies, including at least a first type having a first latency and a second type having a second latency, greater than the first latency;

a network comprising multiple nodes having respective network interfaces and interconnects between the network interfaces, which include at least first and second network interfaces connected by a first physical interconnect of the first type; and a processor, which is configured to test a configuration of the network in which the first physical interconnect is to be replaced by a second physical interconnect of the second type, without physically replacing the first physical interconnect with the second physical interconnect, by instructing at least one of the first and second network interfaces to transmit data over the first physical interconnect while applying a delay in transmission of the data corresponding to a difference between the second latency and the first latency.

11. The system according to claim 10, wherein the processor is configured to instruct both the first and the second network interfaces to apply the delay in bidirectional transmission over the first physical interconnect.

12. The system according to claim 10, wherein the at least one of the first and second network interfaces comprises a buffer, which is configured to receive data blocks for transmission over the first physical interconnect, and to buffer the data blocks before transmission for a period corresponding to the delay that is to be applied.

13. The system according to claim 10, wherein the processor is configured to instruct the at least one of the first and second network interfaces to adjust the delay over two or more different delay values in order to test configurations in which the first physical interconnect is to be replaced by different interconnects of two or more different types.

14. The system according to claim 10, wherein the processor is configured to test configurations in which the physical interconnects between multiple different pairs of the network interfaces are to be replaced by other physical interconnects of one or more other types by instructing the network interfaces in the multiple different pairs to apply delays concurrently.

15. The system according to claim 10, wherein the network in which the configuration is tested is a test network, and wherein the system further comprises an operational network, in which the second physical interconnect is physically installed after testing the configuration in the test network.

16. The system according to claim 10, wherein the multiple interconnect types comprise a set of cable types including copper cables and optical cables.

17. The system according to claim 10, wherein the processor is configured to instruct the network interfaces to apply respective delays so as to balance data transmission delays among physical interconnects of multiple different types, having different, respective latencies, which are used concurrently for data transmission in the network.

18. The system according to claim 17, wherein the data transmission delays are balanced so as to compensate for the different, respective latencies of cables of different, respective lengths.

* * * * *